United States Patent

Shendi et al.

(10) Patent No.: US 6,548,935 B1
(45) Date of Patent: Apr. 15, 2003

(54) CLAN POLE GENERATOR

(75) Inventors: Alexander Shendi, Asperg (DE); Jérome Debard, Cardiff (GB); Sylvian Briand, Magor (GB)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/868,479

(22) PCT Filed: Sep. 7, 2000

(86) PCT No.: PCT/DE00/03092

§ 371 (c)(1),
(2), (4) Date: Aug. 13, 2001

(87) PCT Pub. No.: WO01/31762

PCT Pub. Date: May 3, 2001

(30) Foreign Application Priority Data

Oct. 23, 1999 (DE) .......................... 199 51 115

(51) Int. Cl.[7] ........................... H02K 1/28; H02K 21/04
(52) U.S. Cl. ........................................ 310/263; 310/42
(58) Field of Search ........................... 310/263, 91, 42, 310/156.08, 156.28, 156.66; 29/598

(56) References Cited

U.S. PATENT DOCUMENTS

| | | | | |
|---|---|---|---|---|
| 5,734,216 A | * | 3/1998 | Yamada et al. | 310/156 |
| 5,747,913 A | | 5/1998 | Amlee et al. | 310/263 |
| 5,973,435 A | * | 10/1999 | Irie et al. | 310/263 |
| 6,013,967 A | * | 1/2000 | Ragaly et al. | 310/263 |
| 6,013,968 A | * | 1/2000 | Lechner et al. | 310/263 |
| 6,037,695 A | * | 3/2000 | Kanazawa et al. | 310/263 |
| 6,150,746 A | * | 11/2000 | Lechner | 310/263 |
| 6,201,335 B1 | * | 3/2001 | Higashino et al. | 310/263 |
| 6,369,486 B1 | * | 4/2002 | Armiroli et al. | 310/263 |

FOREIGN PATENT DOCUMENTS

| | | | | |
|---|---|---|---|---|
| DE | 198 02 786 A | | 7/1999 | |
| DE | 198 06 667 A | | 8/1999 | |
| DE | 19951115 | * | 10/1999 | 310/263 |
| EP | 0 991 162 A | | 4/2000 | |
| EP | 0991162 | * | 4/2000 | 310/263 |
| FR | 2 786 624 A | | 6/2000 | |

OTHER PUBLICATIONS

Patent Abstracts of Japan vol. 1999, No. 09, Jul. 30, 1999 & JP 11 098787, Apr. 9, 1999.
Patent Abstracts of Japan vol. 1998, No. 08, Jun. 30, 1998 & JP 10 066286, Mar. 6, 1998.

* cited by examiner

*Primary Examiner*—Tran Nguyen
(74) *Attorney, Agent, or Firm*—Michael J. Striker (57) ABSTRACT

An electric machine is proposed, in particular a generator for a motor vehicle, having an excitation system comprised of a number of electrically excited individual poles in the stator or rotor. The stator (40) or rotor (39) is embodied in the form of electromagnetically excited poles (37, 38) which are oriented axially along the circumference and whose polarity alternates in the circumferential direction, in which permanent magnets (43) are inserted into intermediary spaces (42) between the alternating poles (37, 38) in order to reduce the magnetic leakage flux. The attachment of the permanent magnets (43) to the stator (40) or rotor (39) is characterized in that the permanent magnets (43) are each secured by means of a securing element (44) which cannot be excited magnetically, wherein these securing elements are secured on both sides in pole grooves (46, 47) and one pole groove (46) is let into the longitudinal side of a pole (37) and one pole groove (47) is let into the longitudinal side of an opposing pole, the pole (38).

6 Claims, 6 Drawing Sheets

FIG. 12
PRIOR-ART

CLAN POLE GENERATOR

BACKGROUND OF THE INVENTION

The invention is based on an electrical machine particularly alternative current generator, also known as alternator, for a motor vehicle.

Electrical machines of the above-mentioned type, in particular claw-pole generators, are generally known. U.S. Pat. No. 5,747,913 has disclosed an electrical machine in the form of a generator with a rotor of the claw-pole design with permanent magnets. The permanent magnets disclosed there are accommodated in intermediary spaces of two adjacent, antipolar, claw-shaped poles. The permanent magnets are contained in such a way that the claw-shaped poles have a profile with projections that is essentially T-shaped in the axial direction. After installation, the permanent magnets are disposed underneath the projections of the T-shaped cross sections of the poles so that a centrifugal stress, which comes from the permanent magnets when the rotor is rotated, acts on the projections of the poles and is absorbed there by these poles.

A disadvantage of the manner disclosed there for containing the permanent magnets is that the distance between two successive antipolar poles is reduced by the projections of the T-shaped cross sections and the leakage flux between two adjacent antipolar projections is therefore increased. The increase of the leakage flux stands in contrast to the use of permanent magnets, which are intended to counteract the leakage flux.

BRIEF SUMMARY OF THE INVENTION

However, with the electrical machine according to the invention, in particular a generator and/or claw-pole generator for motor vehicles, with the characterizing features of the present invention, it is possible to insert permanent magnets into the intermediary space between two adjacent, antipolar, claw-shaped poles without reducing the distance between two antipolar poles. In order to achieve this, permanent magnets are inserted into the intermediary spaces between the alternating poles and are each secured by means of a securing element which in particular cannot be magnetically excited. The securing element itself is secured in grooves on both sides, where one groove is let into the longitudinal side of a magnetic north pole and one groove is let into the longitudinal side of an adjacent magnetic south pole.

Advantageous improvements and updates the characteristics disclosed in the main claim are possible by means of the measures taken in the dependent claims.

Through the use of a relatively thin securing element which can therefore be easily deformed, the surface pressure between the permanent magnet and the securing element is low under rotational stress. In addition, the securing element secures the permanent magnet in both its radial and axial position in the rotor.

One possiblility for axially securing the permanent magnets in relation to the respective securing elements is comprised in that tabs are bent away from a base region of the securing element and limit the axial motion. In this connection, it is possible for the bent tabs to exert a clamping force on axial end faces of the inserted permanent magnet. If elongated bent tabs are angled in end regions so that the permanent magnet is at least partially enclosed, it is possible to clamp the permanent magnet in place in the axial direction by means of the tabs and on the other hand, to clamp the permanent magnet in place between the base region and the end regions.

Another possibility is comprised of using an adhesive to glue the permanent magnet to a base region of the securing element, which is merely essentially flat. This also achieves both an axial and radial fixing of the permanent magnet.

Inserting the base region, together with the permanent magnet, into the grooves is simplified if the base region of the securing element is tapered on at least one axial end. It is easy to fix the axial position of the securing element, together with the permanent magnet, in the rotor because at each axial end of the unit, at least one of the grooves is narrowed in its cross section by means of caulking. Both edges of each claw-shaped pole must be machined in such a way that the grooves assume a precisely determined position.

The machining of the north and south pole edges of the north and south claw poles that extend from each magnet wheel disk is simplified because on end faces of the magnet wheel disk that are oriented axially outward, the stator or rotor has reference elements at uniformly spaced angular intervals. These reference elements permit an alignment of the poles in relation to a tool, for example a groove tool.

BRIEF DESCRIPTION OF THE DRAWINGS

Exemplary embodiments of the invention will be explained in detail below in conjunction with the accompanying drawings.

DESCRIPTION OF TH EXEMPLARY EMBODIMENTS

Parts which are identical or function in the same manner are provided with the same reference numerals.

Figure 12:
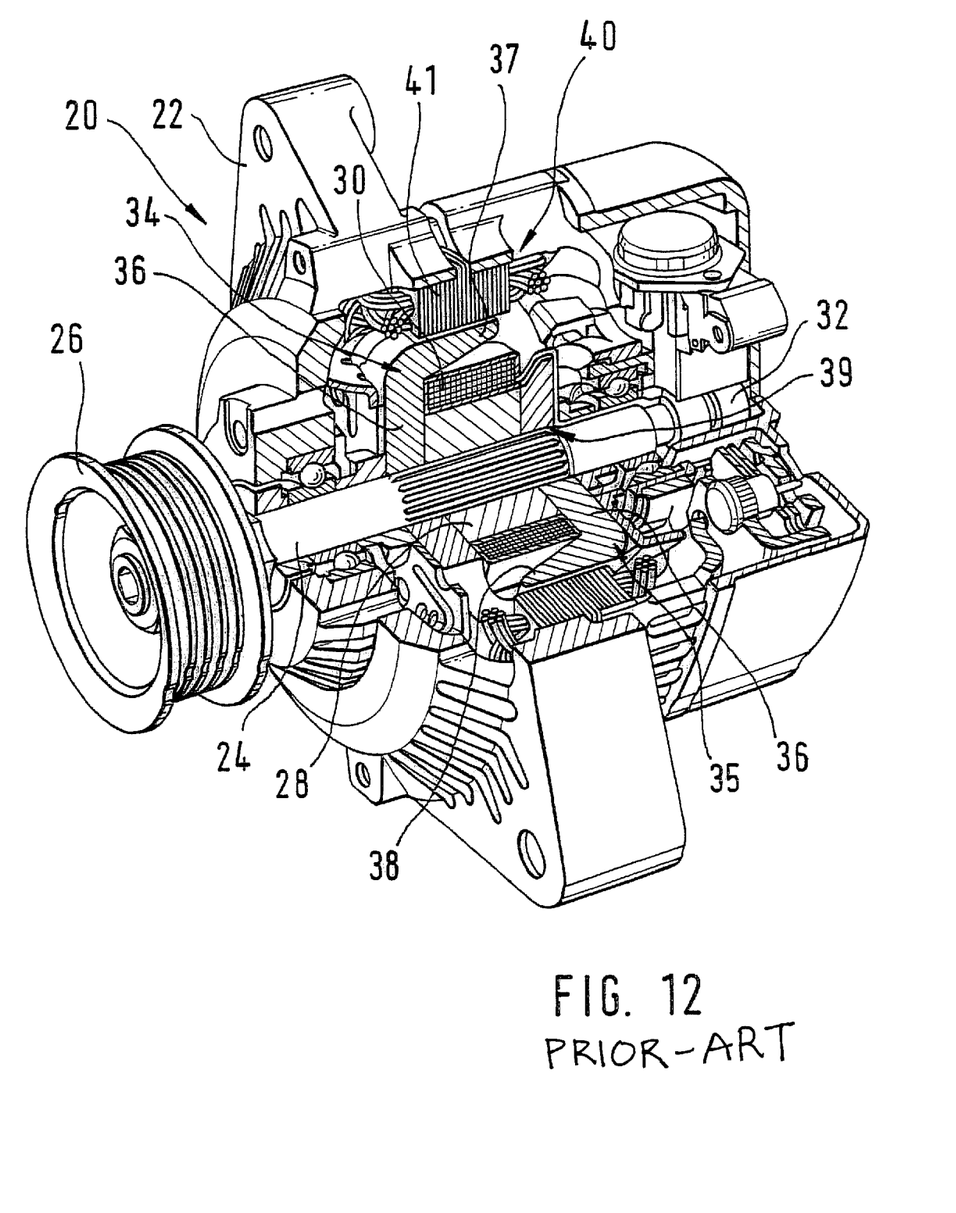
FIG. 12 is a perspective representation of a known claw-pole generator.

For better comprehension of the invention, FIG. 12 shows the general design of a known claw-pole generator, where only the essential components are discussed. The claw-pole generator 20 has a housing 22 in which a drive shaft 24 is supported. On its end disposed outside the housing 22, the drive shaft 24 has a pulley 26 affixed to it, which is used to drive the drive shaft 24 with a pole core 28, for example by means of a V-belt. Inside the housing 22, an. excitation winding 30 is nonrotatably affixed to the drive shaft 24 and is supplied with a relatively low excitation current via a slip ring 32 likewise affixed to the drive shaft 24. The excitation winding 30 is laterally encompassed by a drive-side magnet wheel half 34 and a brush-side magnet wheel half 35. The drive-side magnet wheel half 34 is comprised of a magnet wheel disk 36 extending perpendicular to the drive shaft 24 and claw-shaped poles 37 that extend longitudinally in relation to the drive shaft 24. The brush-side magnet wheel half 35 is likewise comprised of a magnet wheel disk 36 extending perpendicular to the drive shaft 24 and claw-shaped poles 38 that extend longitudinally in relation to the drive shaft 24. Each of the magnet wheel halves 34 and 35 has a number of these poles 37, 38 spaced apart from one another uniformly in the circumference direction, wherein the number is a function of the intended use of the generator.

The drive shaft 24, together with the magnet wheel halves 34 and 35, constitutes the pole core 38 and the excitation winding 30 constitutes a rotor 39.

It can be inferred from FIG. 12 that the poles 37 and 38 of the opposing magnet wheel halves 34 and 35 interlock so that when the excitation winding 30 is supplied with power, magnetic south and north poles are produced which alternate in the circumference direction of the magnet wheel.

Figure 1:
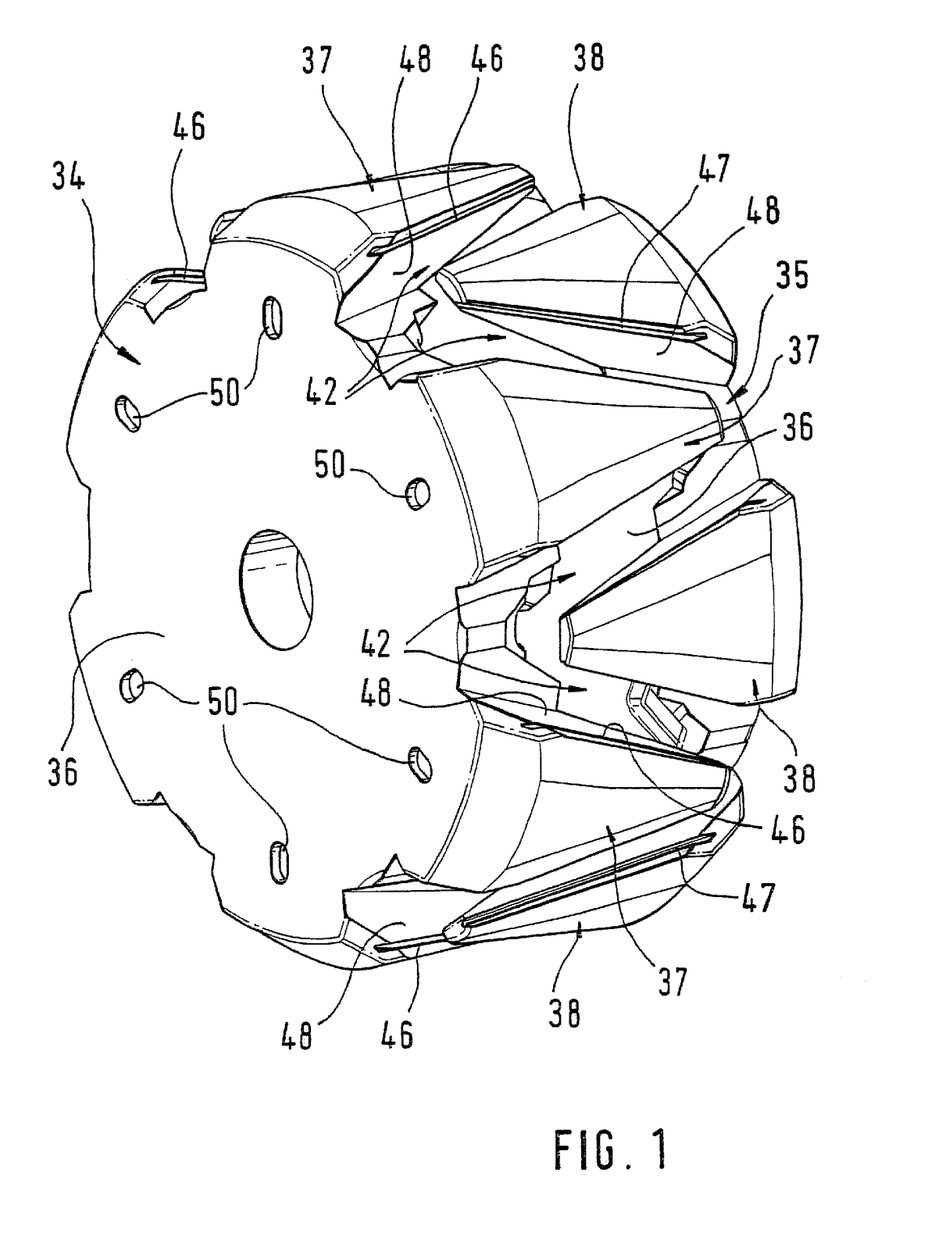
FIG. 1 is a perspective representation of a rotor of a claw-pole generator.

Spaced radially apart from the poles 37 and 38 of the two magnet wheel halves 34 and 35, there is a stationary stator 40 which has a for example three-phase stator winding 41. The stator 40 is comprised of reciprocally insulated plates, which are provided with grooves and are pressed together to form a fixed sheet stack. Windings of the stator winding 41, which are partially visible in FIG. 1, are embedded in the grooves. During operation, a magnetic flux is produced which travels from the core of the excitation winding 30, the so-called pole core 28, via the magnet wheel disk 36 and the poles 38 of one magnet wheel half 34, to the stator 40 and from there, into the adjacent poles 37 of the other magnet wheel half 35, and via the magnet wheel disk 36 back to the pole core 28, thus closing the magnetic circuit again. In conventional generators, a considerable leakage flux occurs in the intermediary spaces 42 between two adjacent poles 37 and 38.

In order to prevent or reduce this leakage flux, permanent magnets 43 which counteract the leakage flux are intentionally inserted into this intermediary space.

In FIG. 1, the two magnet wheel halves 34 and 35 are depicted in their installed position in relation to each other in the claw-pole generator 20. The two equiaxially opposing magnet wheel disks 36 are shown, in this case each with a total of six poles 37 and 38. The poles 37 of the one magnet wheel half 34 are disposed in the gaps between two poles 38 of the magnet wheel half 35.

Figure 10:
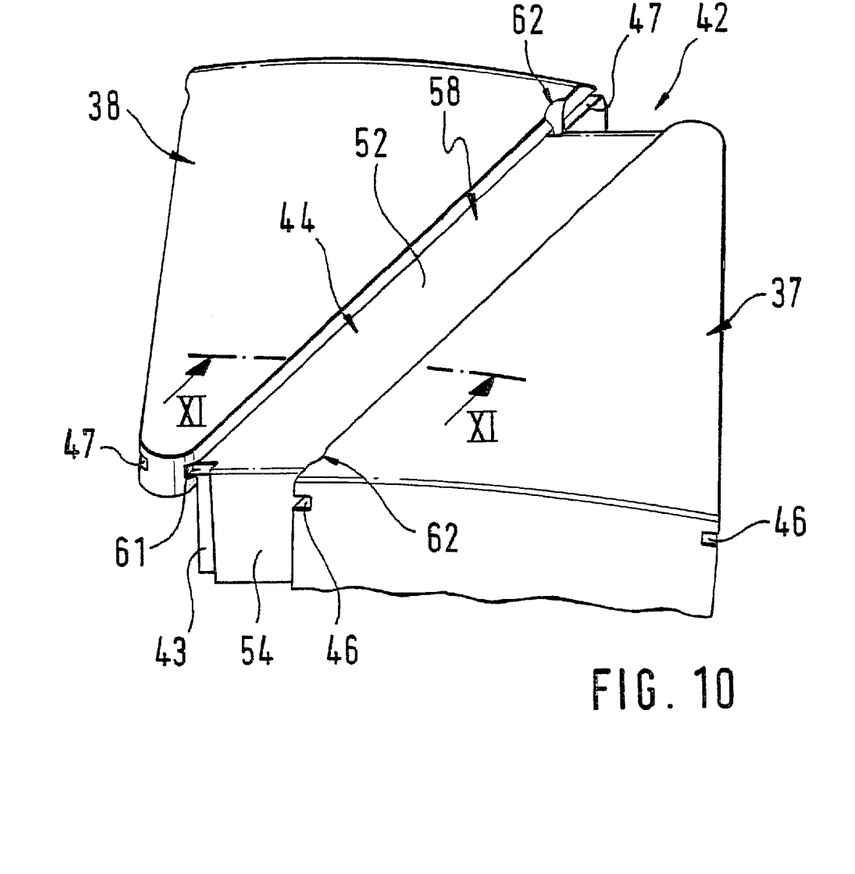

The intermediary spaces 42 thus produced between a respective pole 37 of the magnet wheel half 34 and a pole 38 of the magnet wheel half 35 have permanent magnets 43 inserted into them by means of securing elements 44 that cannot be magnetically excited, also see FIG. 10. The securing elements 44 are slid into opposing pole grooves 46 and 47 along the circumference. The pole grooves 46 and 47 are recessed into edges 48 of the poles 37 and 38, as clearly shown in FIG. 1.

In order for all of the left-side and right-side edges 48 of each magnet wheel half 34 and 35 to have the same angular spacing from one another after the edges 48 have been finished by a tool, it is advantageous if the stator 40 of the electric machine or as shown in FIG. 1, each magnet wheel half 34 or 35, has reference elements 50 at uniformly spaced angular intervals along its end faces that are oriented axially outward. These reference elements 50, which are preferably recesses, can be used to align the magnet wheel halves 34 and therefore the claw-shaped poles 37 and 38 in relation to the edge-finishing tool. The spacing of the reference elements 50 is preferably equal to the quotient of 360 angular degrees and the number of poles 37 or 38 per end face of a magnet wheel half 34 or 35. The reference elements 50 can, for example, be so-called oblong holes.

Figure 2:
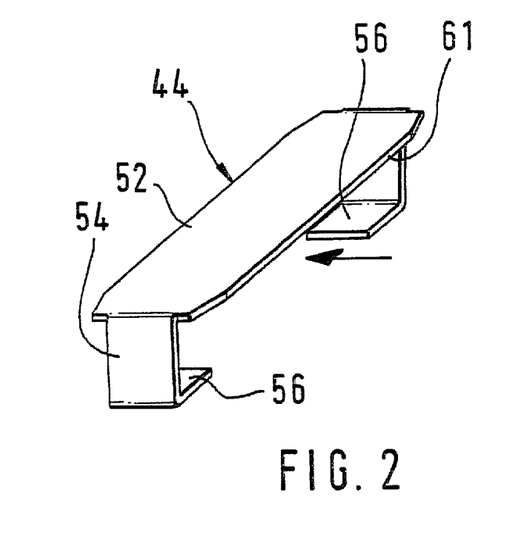
FIG. 2 is a perspective representation of a securing element according to the invention in a first exemplary embodiment.

FIG. 2 shows a first exemplary embodiment of the securing element 44. The securing element 44 is comprised of a base region and 52, which has a tab 54 at each axial end. Each tab 54 is bent or angled away from the base region 52. At each end of the tabs 54 remote from the base region 52, there is a likewise angled or bent end region 56. The end regions 56 of the tabs 54 thus have surfaces which are oriented toward the base region 52. The securing element 44 shown in FIG. 2 has a base region 52 which is tapered at both axial ends. These tapered zones facilitate the insertion of the securing element 44 into the pole grooves 46 and 47 of the poles 37 and 38. The base region 52 of the securing element 44 is advantageously tapered on least one axial end.

Figure 3:
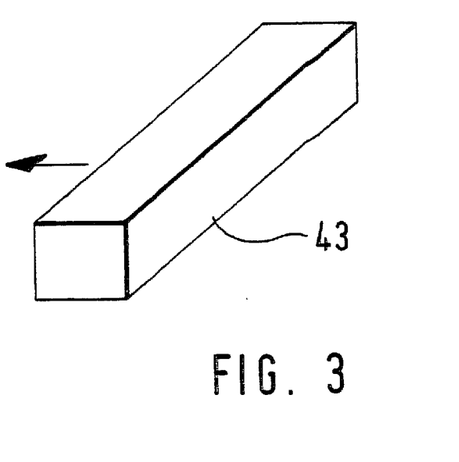
FIG. 3 shows a permanent magnet of the kind that is provided for the securing element shown in FIG. 2.

FIG. 3 shows the block-shaped permanent magnet 43 which can be contained by the securing element 44 according to FIG. 2.

Figure 4:
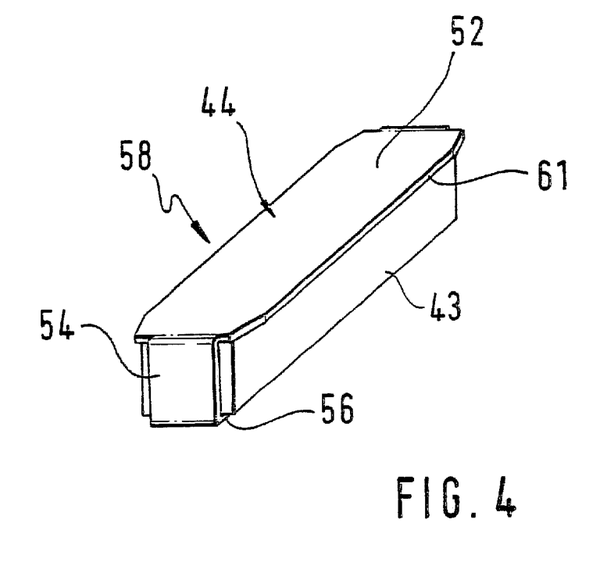
FIG. 4 shows the preassembled unit comprised of a securing element and permanent magnet.

FIG. 4 shows a preassembled unit 58 comprised of the securing element 44 and permanent magnet 43 according to the first exemplary embodiment. In this preassembled unit 58, the permanent magnet 43 is mostly enclosed by the base region 52, the two tabs 54, and likewise the two end regions 56. As a result, on the one hand the permanent magnet 43 is clamped in place in the axial direction by the two tabs 54 and on the other hand, the permanent magnet 43 is clamped in place between the base region 52 and the two end regions 56.

Figure 5:
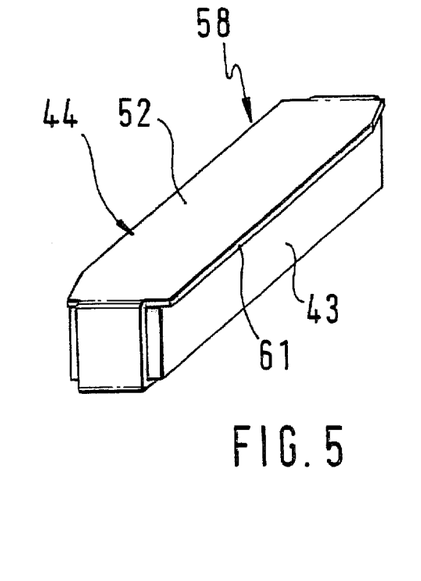
FIG. 5 shows a slight modification of the unit shown in FIG. 4.

FIG. 5 shows the basic assembly of the unit 58 comprised of the securing element 44 and permanent magnet 43, which has already been described in conjunction with FIG. 4. As opposed to FIG. 4, the base region 52 does in fact have tapered zones at both axial ends, but in contrast to FIG. 4, these are produced by beveled zones being provided at diagonally opposite corners of the base region 52.

Figure 6:
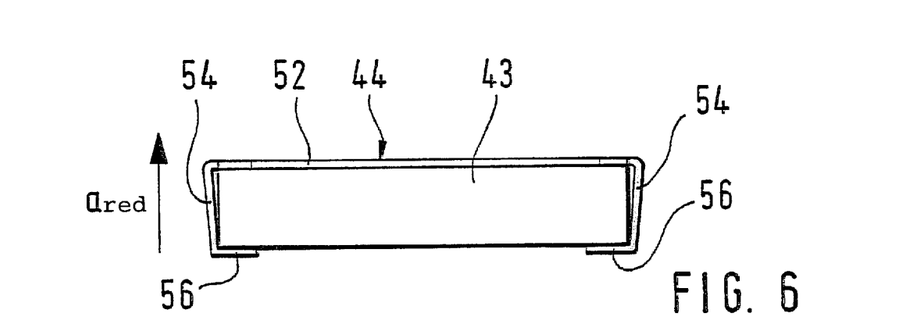
FIG. 6 is a side view of the unit shown in FIG. 4.

FIG. 6 is a side view of a unit 58 comprised of a securing element 44 and permanent magnet 43. In contrast to the embodiments mentioned above, it is essential here that an acute angle is enclosed between each of the tabs 54 and the base region 52. The momentum acting in the angle between the base region 52 and the tabs 54 must at least clamp the permanent magnet 43 in place. After installation, if the unit 58 is subjected to a centrifugal acceleration ared, then the permanent magnet 43 is additionally clamped against the base region 52 by the two end regions 56.

Figure 7:
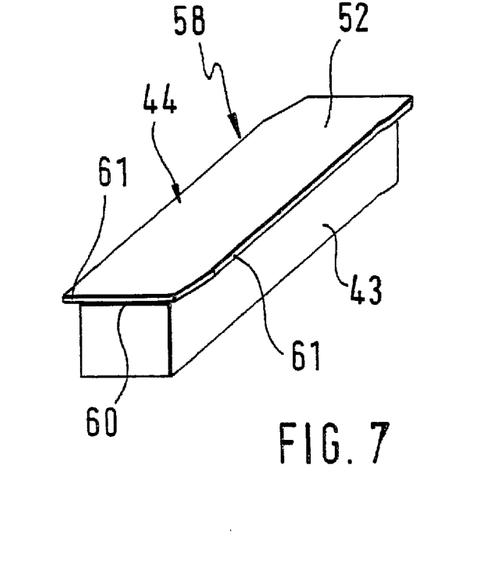
FIG. 7 is a perspective representation of a second exemplary embodiment of a unit.

FIG. 7 shows a second exemplary embodiment of a unit 58 comprised of a securing element 44 and permanent magnet 43. In this case, the permanent magnet 43 is glued to the base region 52 of the securing element 44 by means of an adhesive 60.

Figure 8:
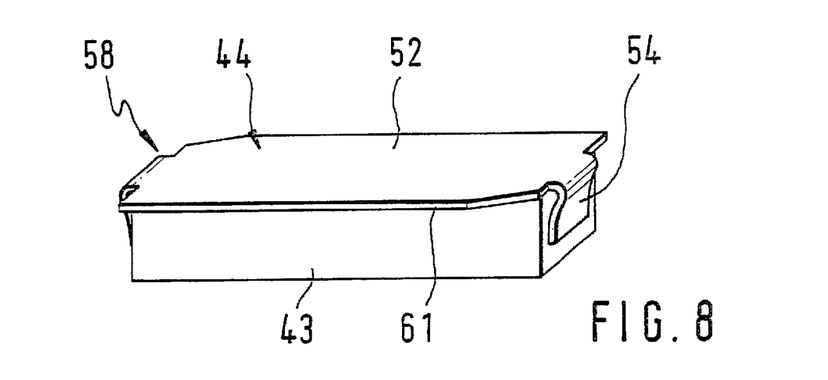
FIG. 8 shows a third exemplary embodiment of the unit.

FIG. 8 shows a third exemplary embodiment of a unit 58. As is already known from the first exemplary embodiment, bent tabs 54 extend from the base region 52 and exert an axial clamping force on the permanent magnet 43 at both of its ends. This axial clamping force and the friction acting between the permanent magnet 43 and the two tabs 54 secures the position of the permanent magnet 43 in relation to the base region 52.

Figure 9:
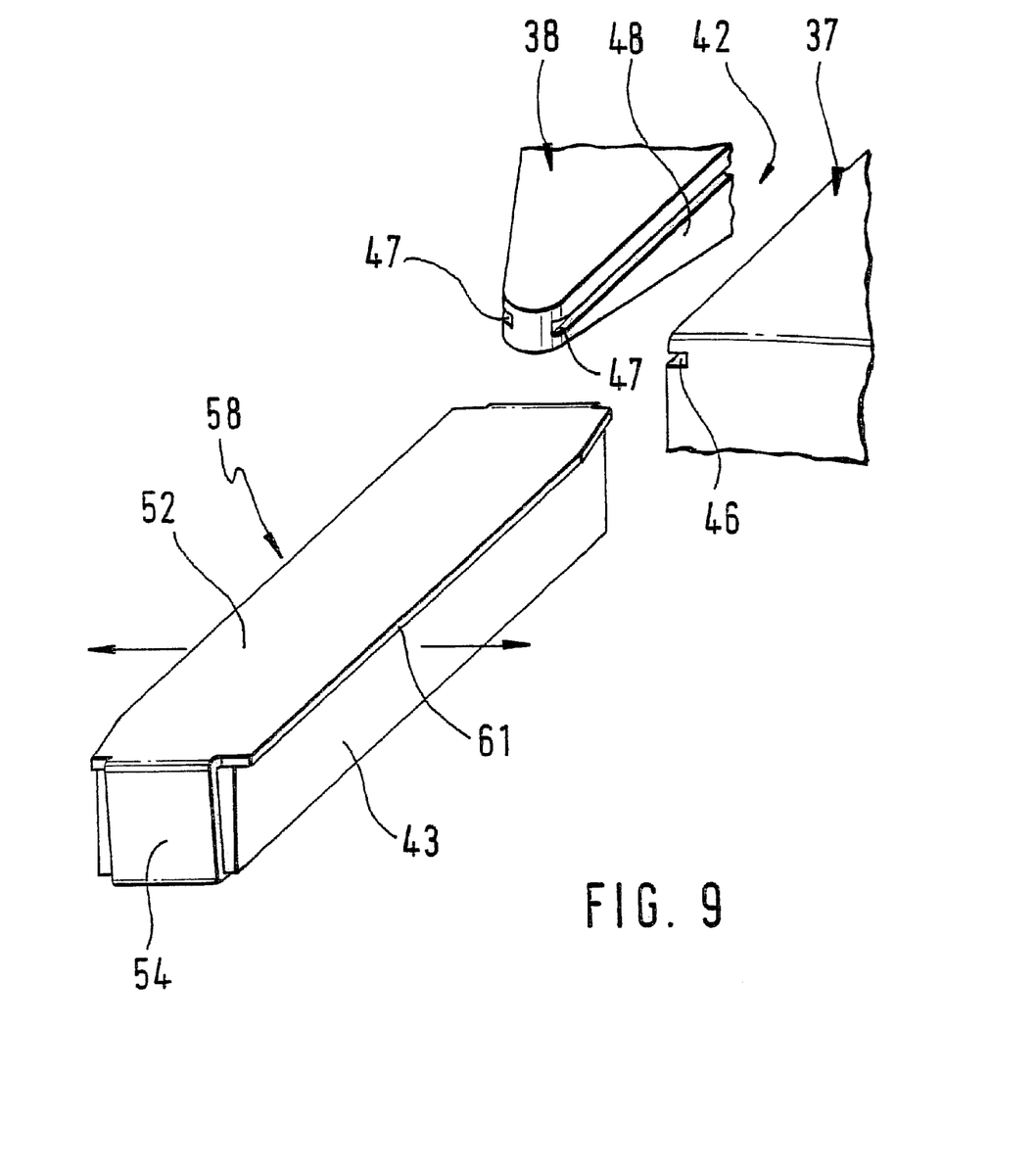
FIG. 9 is a perspective representation of the unit according to the first exemplary embodiment and the orientation in relation to the pole grooves immediately before installation and FIG. 10 shows it after the installation is complete.

FIG. 9 shows how a unit 58 comprised of a securing element 44 and permanent magnet 43 is inserted into an intermediary space 42 between the alternating poles 37 and 38. The lateral, axially aligned, strip-shaped protruding edges 61 of the base region 52 are inserted into the pole grooves 46 and 47 and are thus aligned parallel to these grooves.

FIG. 10 shows how after installation, the unit 58 comprised of the securing element 44 and permanent magnet 43 is disposed in an intermediary space 42 between two poles 37 and 38. The base region 52 of the securing element 44 is slid with its two strip-shaped edges 61 into the pole grooves 46 and 47 disposed opposite them. So that during operation, the units 58 cannot slip out of the magnet wheel halves 34 and 35 that are fixed in relation to each other, the axial position of the unit 58 in the intermediary space 42 between a north and south pole is secured so that at each axial end of the unit 58, at least one of the pole grooves 46 and 47 is narrowed in its cross section by means of a respective constriction 62. In addition, the permanent magnet 43 is covered by a base region 52 in the radial direction toward the stator 40.

Figure 11:
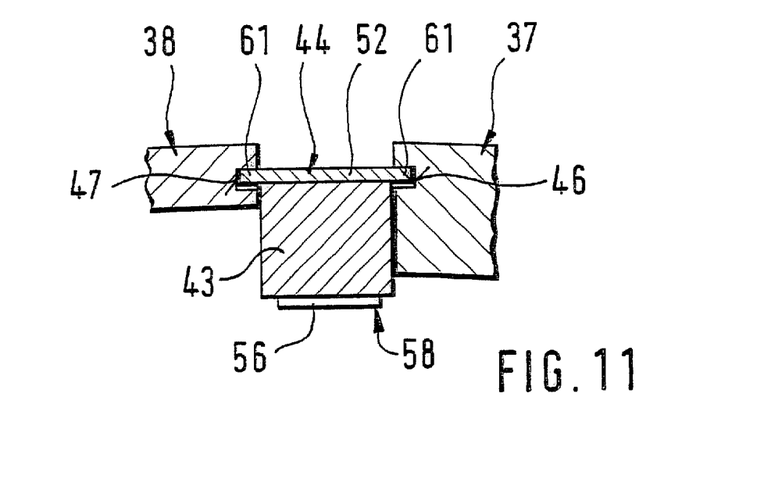
FIG. 11 shows a section along the line XI—XI in FIG. 10.

Finally, FIG. 11 shows a cross section through a unit 58 in its position after installation in the rotor 39, between the two poles 37 and 38 after installation. The centrifugal force stress coming from the permanent magnet 43 is then transmitted, as is readily visible, to the base region 52 of the securing element 44 that covers the permanent magnet. The centrifugal force coming from the securing element 44 and the permanent magnet 43 is in turn transmitted via the strip-shaped edges 61 of the base region 52 to the pole grooves 46 and thereby to the poles 37 and 38 of the magnet wheel halves 34 and 35.

As is evident to a specialist, such an attachment of a permanent magnet 43 by means of a securing element 44 is possible not only with a rotor 39, as shown, but also with a stator 40, which has a design with electromagnetically excited poles which are oriented axially along the circumference and whose polarity alternates in the circumferential direction.

What is claimed:

1. An electric machine, having an excitation system comprised of a number of electrically excited individual poles in one of a stator and a rotor of said electrical machine, embodied in the form of electromagnetically excited poles (37, 38), wherein said poles (37, 38) are oriented axially along the circumference and wherein polarity of said poles (37, 38) alternates in the circumferential direction, and having permanent magnets (43), wherein said permanent magnets (43) are inserted into intermediary spaces (42) between the alternating poles (37, 38) in order to reduce the magnetic leakage flux, characterized in that the permanent magnets (43) are each secured by means of a securing element (44), wherein said securing element (44) cannot be excited magnetically and is secured within respective pole grooves (46, 47) being formed in respective sides of said poles, wherein one pole groove (46) is let into the longitudinal side of a pole (37) and wherein respective said pole grooves are longitudinally formed into respective two longitudinal sides of each of said poles, wherein said rotor (39), a base region (52) of the securing element (44) covers the respective permanent magnet (43) in the radial direction toward the stator (40), wherein the securing element (44) also has bent tabs (54) at two opposite ends of the base region (52), said tabs exert a clamping force on axial end faces of the inserted permanent magnet.

2. The electrical machine according to claim 1, characterized in that the bent tabs (54) each have an end region (56) at the end, wherein said end region (56) is angled in relation to the tab (54) and partially encompasses a permanent magnet (43), wherein on the one hand, the permanent magnet (43) is clamped in place in the axial direction by the tabs (54) and on the other hand, the permanent magnet (43) is clamped in place between the base region (52) and the end regions (56).

3. An electric machine, having an excitation system comprised of a number of electrically excited individual poles in one of a stator or rotor of said electrical machine, embodied in the form of electromagnetically excited poles (37, 38), wherein said poles (37, 38) are oriented axially along the circumference and wherein polarity of the poles (37, 38) alternates in the circumferential direction, and having permanent magnets (43), wherein said permanent magnets (43) are inserted into intermediary spaces (42) between the alternating poles (37, 38) in order to reduce the magnetic leakage flux, characterized in that the permanent magnets (43) are each secured by means of a securing element (44), wherein said securing element cannot be excited magnetically and is secured within respective pole grooves (46, 47) being formed in respective sides of said poles, wherein respective said pole grooves are longitudinally formed into respective two longitudinal sides of each of said poles, wherein the base region (52) of the securing element (44) is tapered on at least one axial end.

4. An electric machine, having an excitation system comprised of a number of electrically excited individual poles in one of a stator or rotor of said electrical machine, embodied in the form of electromagnetically excited poles (37, 38), wherein said poles (37, 38) are oriented axially along the circumference and wherein polarity of said poles (37, 38) alternates in the circumferential direction, and having permanent magnets (43), wherein said permanent magnets are inserted into intermediary spaces (42) between the alternating poles (37, 38) in order to reduce the magnetic leakage flux, characterized in that the permanent magnets (43) are each secured by means of a securing element (44), wherein said securing element cannot be excited magnetically and is secured within respective pole grooves (46, 47) being formed in respective sides of said poles, wherein respective said pole grooves are longitudinally formed into respective two longitudinal sides of each of said poles, wherein the securing element (44) and the permanent magnetic (43) together form a unit, and wherein the axial position of each unit comprised of the securing element (44) and permanent magnet (43) is secured in the intermediary space (42) between a pole (37) and an opposing pole (38), because at each axial end of the unit (58), at least one of the pole grooves (46, 47) has a constriction (62) in its cross section.

5. An electric machine, having an excitation system comprised of a number of electrically excited individual poles in one of a stator or rotor of said electrical machine, embodied in the form of electromagnetically excited poles (37, 38), wherein said poles (37, 38) are oriented axially along the circumference and wherein polarity of the poles (37, 38) alternates in the circumferential direction, and having permanent magnets (43), wherein said permanent magnets (43) are inserted into intermediary spaces (42) between the alternating poles (37, 38) in order to reduce the magnetic leakage flux, characterized in that the permanent magnets (43) are each secured by means of a securing element (44), wherein said securing element (44) cannot be excited, magnetically and is secured within respective pole grooves (46, 47) being formed in respective sides of said poles, wherein respective said pole grooves are longitudinally formed into respective two longitudinal sides of each of said poles, wherein reference recesses are formed at equally spaced angular intervals, said angular intervals spacing by a quotient of 360 angular degrees and a number of said poles per end face.

6. The electrical machine according to claim 1, 3, 4, or 5, characterized in that the permanent magnet (43) is glued to the base region (52) of the securing element (44) by means of an adhesive (60).

* * * * *